United States Patent [19]
Goetz et al.

[11] Patent Number: 6,112,076
[45] Date of Patent: Aug. 29, 2000

[54] MOBILE TELEPHONE SYSTEM

[75] Inventors: Ian Goetz, Thame; Stephen Mark Gannon, Chesham; Peter Robert Munday, Bracknell, all of United Kingdom

[73] Assignee: British Telecommunications public limited company, London, United Kingdom

[21] Appl. No.: 08/983,574

[22] PCT Filed: Jul. 17, 1996

[86] PCT No.: PCT/GB96/01711

§ 371 Date: Jan. 21, 1998

§ 102(e) Date: Jan. 21, 1998

[87] PCT Pub. No.: WO97/04615

PCT Pub. Date: Feb. 6, 1997

[30] Foreign Application Priority Data

Jul. 21, 1995 [EP] European Pat. Off. .............. 95305116

[51] Int. Cl.[7] ...................................................... H04B 7/00
[52] U.S. Cl. .......................... 455/406; 455/445; 455/561
[58] Field of Search ................................... 455/406, 407, 455/408, 414, 418, 422, 455, 458, 445, 450, 452, 560, 561; 370/337, 338

[56] References Cited

U.S. PATENT DOCUMENTS 5,970,403  10/1999  Alperovich et al. .................... 455/406

FOREIGN PATENT DOCUMENTS 0 462 728  12/1991  European Pat. Off. .

OTHER PUBLICATIONS

Telecommunication Access Networks. Technology and Service Trends, Preceedings of the IX International Symposium on Subscriber Loops and Services—ISSLS 91, Amsterdam, Netherlands, Apr. 22–26, 1991, ISBN 0–444–89050–5, 1991, Amsterdam, Netherlands, North–Holland, Netherlands, pp. 69–75, XP000516574 Fineberg V Et Al: "Wireless impact on personal telecommunications services" see whole document.

Fujitus Scientific and Technical Journal, Summer 1992, Japan, vol. 28, No. 2, ISSN 0017–2523, pp. 181–191, XP000312059, Hayashi Et Al: "Corporate Information network system: COINS" see paragraph 3—paragraph 4.5; figures 2–6.

Globecom '89 IEEE Global Telecommunications Conference and Exhibition. Communications Technology for the 1990S and Beyond (Cat. No. 89CH2682–3), Dallas, TX USA, Nov. 27–30, 1989, 1989, New York, NY, USA, IEEE, USA, pp. 539–542 vol. 1, XP000091154 Eberl L H et al: "Intergrated ISDN D–server for intelligent networking" see the whole document.

Patent Abstracts of Japan vol. 018, No. 428 (E–1591), Aug. 10, 1994 & JP,06 1342969 (NEC Corp), May 13, 1994, see abstract.

Primary Examiner—Thanh Cong Le
Attorney, Agent, or Firm—Nixon & Vanderhye P.C.

[57] ABSTRACT

A mobile telephone system has a base transceiver station (BTS) that provides radio communication with a mobile handset (MS) and also communicates with a control station (BSC) through a communication link in the form of a leased line which provides a first communication path with a predetermined bandwidth for signals communicated between the BTS and the BSC. A communication network in the form of an ISDN is used to provide a selectively connectable second communication path between the BTS and the BSC so as to augment the bandwidth available for the signals during periods of peak demand. In order to accommodate different call connection times in the system through the leased line and the ISDN, the BSC/BTS are arranged to produce all connection signals that initiate billing at the same time irrespective of the path used to make the call connection.

23 Claims, 4 Drawing Sheets

MOBILE TELEPHONE SYSTEM

BACKGROUND OF THE INVENTION

1. Field of the Invention

This invention relates to a mobile telephone system and a method of providing a communication channel for mobile telephony, and has particular but not exclusive application to digital mobile systems, for example Global System for Mobile Communications (GSM) systems.

2. Related Art

In a conventional GSM mobile cellular telephone system, a mobile station (MS) such as a mobile telephone handset communicates through a radio link with one of a number of fixed base transceiver stations (BTS) distributed at different geographical locations throughout the area of coverage of the system. Clusters of BTS's are connected to a base station controller (BSC) through landlines. Subgroups of the BTS's may be coupled through a hub to the BSC. Groups of BSC's are coupled by means of respective landlines to a mobile switching centre (MSC). The MSC, in addition to being connected to other BSCs, has a connection to a public switched telephone network (PSTN). The system permits communication to be established between two MSs, or between a MS and a conventional telephone connected to the mobile system through the PSTN, or to another network.

Conventionally, the landlines that are used to connect each BTS to its hub, or direct to the BSC, are leased from a terrestrial telecommunications system provider. The leased line needs to have sufficient bandwidth for the peak data traffic flows that occur in use in the network, with the result that during periods of low system utilisation, the bandwidth of the lines is not fully utilised. However, the leased line is rented on a continuous basis rather than on its level of utilisation and so the cost-effectiveness of the lines decreases during periods of low use. A typical so-called E1 (or T1 in the USA) leased digital line offers a bandwidth of 2 MB/s whereas typical data rates between a BTS and its associated hub are of the order of 1 MB/s or less.

Terrestrial system providers also offer digital leased lines, which can be rented with a fixed bandwidth of N×64 kb/s, where N is an integer typically from 1–30. These lower-bandwidth leased lines are suitable for providing the connection between each BTS and the BSC, either via a hub or directly. The leased line connection to a BTS suffers from a disadvantage that in order to provide sufficient bandwidth when the BTS is operating close to its maximum utilisation level, the bandwidth needs to be selected to be higher than that needed for the traffic levels that occur for most of the time. This increases the cost of the leased line. Similarly, an E1/T1 leased line which can deal with peak levels between the hub and the BSC may provide excessive capacity for average traffic levels that can occur during normal levels of utilisation of the system. Similarly, if the capacity of the BTS is expanded, additional bandwidth may be needed, i.e. another leased line may be required which will be inefficient and costly for average traffic flow, but needed in order to handle peak traffic flow rates.

It is known, for example from European Patent Application No 0398183 (Northern Telecom) for a private telephone system having a communication link (e.g. a private link) for providing a first communication path for signals communicated between two nodes of the system to provide the nodes with further connections for communication with a communications network (e.g. a public network); and control means operable to selectively provide a second communication path, through the communications network, for augmenting the bandwidth available on the first communication path for signals communicated between the nodes. For each call, traffic may be carried on either the first path or the second path, but control signalling between the mobile station and the network termination is always carried on the first path. This principle can be applied to the connections between a base transceiver station and control station of a mobile telephone system, by providing the communication link as a leased line, so as to provide the first communication path, and providing the communication network as an integrated services digital network (ISDN) so that the second communication path can be selectively set up through the ISDN to provide additional bandwidth for the signals in the event of high system utilisation. The ISDN is billed to the user according to the amount of time it is used and so the bandwidth available for the signals can be augmented by providing the second communication path, with the cost only being incurred for the time it is used for the second path. In this way, the leased line can be selected to have a bandwidth which can be used at a relatively high utilisation rate during normal operation, because in the event of higher utilisation rates, the second path can be selectively connected to handle the additional 'peak' bandwidth requirement that occurs during high levels of system use.

However, although the links between the base transceiver stations and control stations form a private network, they carry tariff-bearing mobile telephone calls. This causes a problem, because when a call is connected through the system, the time required to establish connection may typically be greater through the first path than through the second path, for example where the first path comprises a leased line and the second path consists of an ISDN. Billing to the user is established by a "call-connect" signal which is transmitted back, typically to the BTS in order to signal that the connection has been made and that billing can commence. Discrepancies could arise, either when the call-connect signal over the leased line arrives first, in which case the MS user would be charged for the time between the arrival of the call-connect signal and the actual time of connection over the ISDN. Conversely, if the call connect signal over the ISDN path were to arrive first (or the call-connect signal over the leased line fails to arrive at all, for example because the call is not answered) the mobile network operator will be charged for the ISDN link before the MS user is connected, thereby incurring an unnecessary cost to the mobile network operator. Note that the ISDN call-connect signal only relates to the connection between the BTS and the BSC.

SUMMARY OF THE INVENTION

According to the invention, there is provided a mobile telephone system comprising a base transceiver station for providing radio communication with one or more mobile stations; a control station for providing call connections between a mobile station and other network terminations; a communication link for providing a first communication path for signals communicated between the base transceiver station and the control station; the base transceiver station and the control station further having connections for communication with a communications network; control means operable to selectively provide a second communication path, through the communications network, for augmenting the bandwidth available on the first communication path for signals communicated between the base transceiver station and the control station; and means for initiating time billing for the first and corresponding second paths in a predetermined time relationship in response to initiation of a dialled call connection between a mobile station and a network termination.

According to another aspect, there is provided a method of providing a communication channel for mobile telephony, wherein a base transceiver station provides radio communication with a mobile system and the base transceiver station provides communication with a control station; the method comprising providing a first communication path with a predetermined bandwidth for signals communicated between the base transceiver station and the control station through a fixed communication link, selectively providing a second communication path for signals communicated between the base transceiver station and the control station, through a communication network for augmenting the available bandwidth for the signals; wherein time billing is initiated for the first and second paths in a predetermined time relationship in response to initiation of a dialled call connection.

This arrangement ensures that there are no billing differences between calls established through the ISDN path and calls established through the leased line.

Preferably, the system has means for transmitting respective call connect signals along the first and second communication paths in response to establishment of respective paths, and means for preventing transmission of the call connect signals until both paths are established and means responsive to reception of the call connect signals for initiating time-related billing for the first and second paths respectively.

Preferably, this may be achieved by arranging that the call connect signals are transmitted along both the first and second communications paths from one end to the other such that they arrive at the other end substantially simultaneously.

BRIEF DESCRIPTION OF THE DRAWINGS

In order that the invention may be more fully understood an embodiment thereof will now be described by way of example with reference to the accompanying drawings in which.

DETAILED DESCRIPTION OF EXEMPLARY EMBODIMENTS

Figure 1:
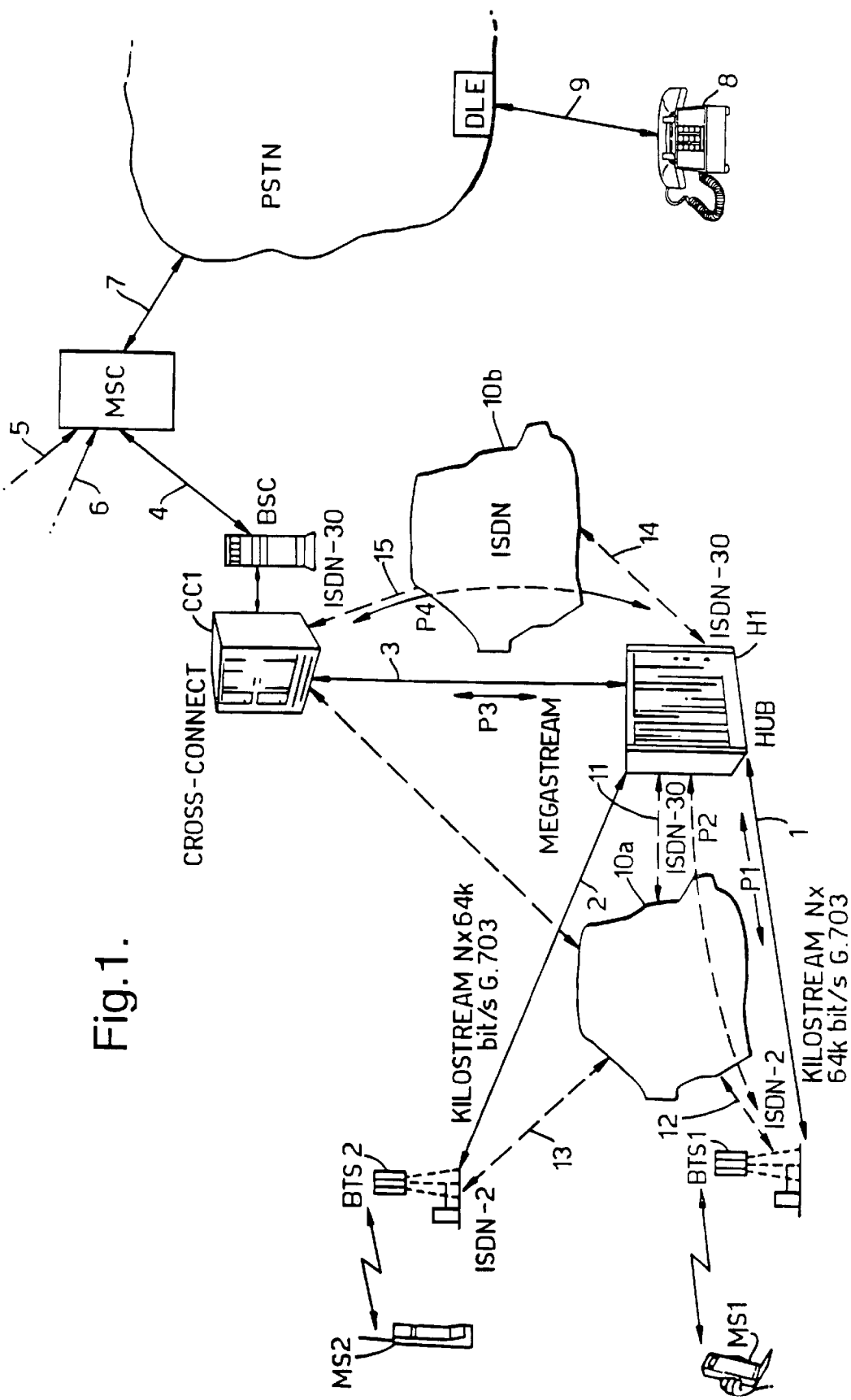
FIG. 1 is a schematic block diagram of a mobile telephone system in accordance with the invention.

Referring to FIG. 1, a cellular mobile GSM digital telephone network is shown which includes a plurality of base transceiver stations BTS1, BTS2 distributed at various locations throughout the area of coverage provided by the system. Each BTS1, 2 can communicate by digital cellular GSM techniques with mobile system such as mobile telephone handsets MS1, 2. As shown in FIG. 1, BTS1 and BTS2 are connected by means of leased digital landlines 1, 2 to a hub H1 which is connected by landline 3 to a BSC and an associated cross-connect CC1. The BSC is connected by a further line 4 to a mobile switching centre MSC which is connected by lines 5, 6, 7 to further network terminations, both mobile (via further MSCs, not shown) and fixed (via a conventional public switched telephone network PSTN). A conventional telephone handset 8 is shown connected by line 9 to a digital local exchange DLE which forms part of the PSTN.

Figure 2:
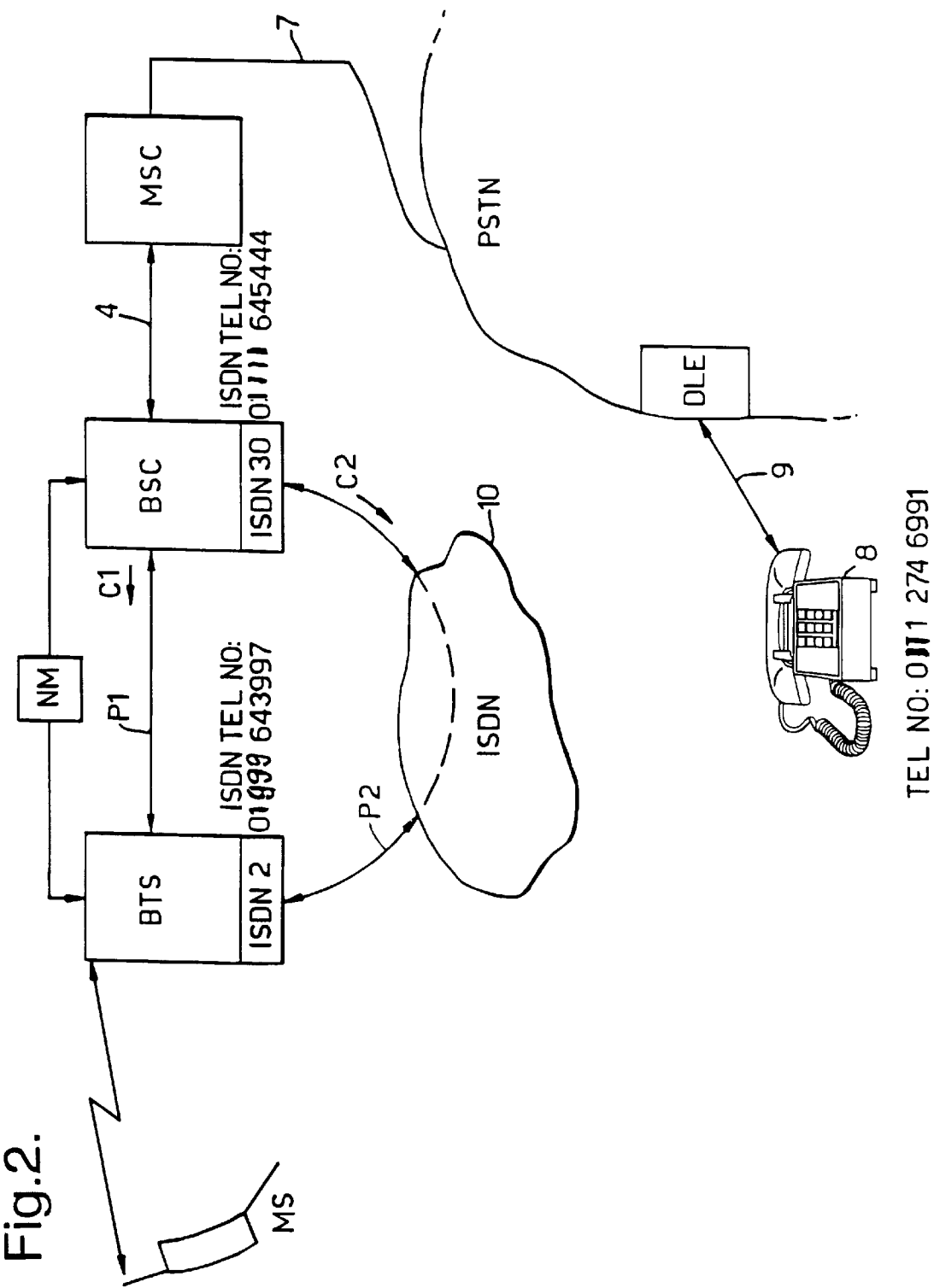
FIG. 2 illustrates an alternative configuration in which a BTS is connected directly to the BSC without a hub.
Figure 4:
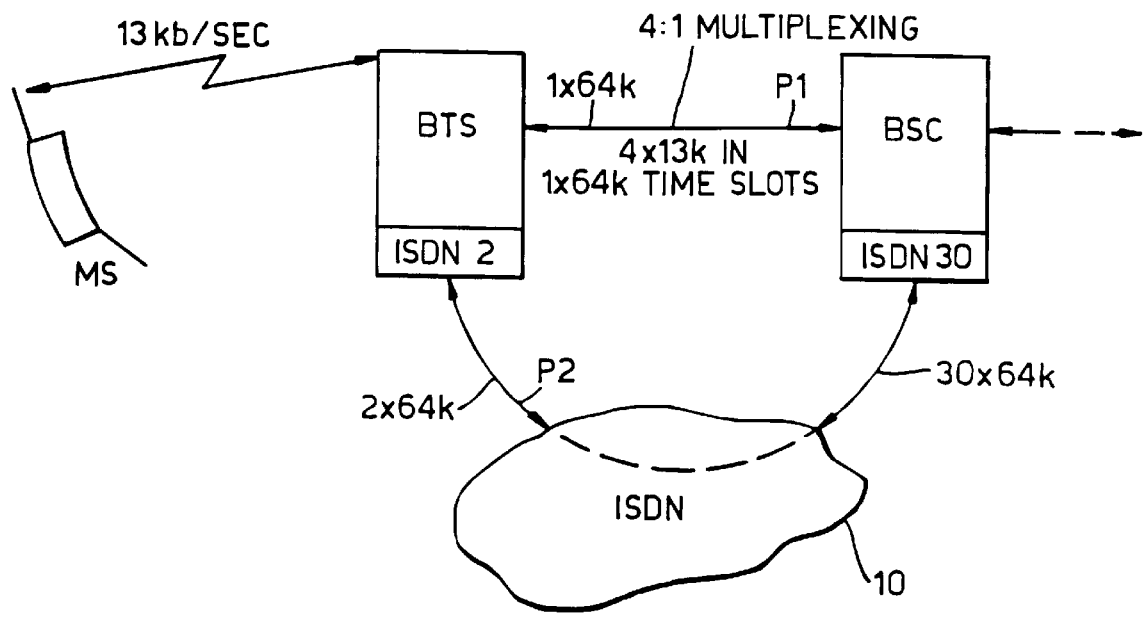
FIG. 4 illustrates in more detail signal configurations used to communicate between the BTS and BSC shown in FIG. 2.

FIGS. 2 and 4 show a simplified network for illustrative purposes, having a single mobile station (MS), and base transceiver site (BTS), the latter connected directly to the base site controller (BSC) (i.e. not via a hub). The BTS and BSC have ISDN telephone connections. The BTS and BSC are both under the control of a Network Management system (NM) which monitors and controls the operation of the cellular network.

Figure 3:
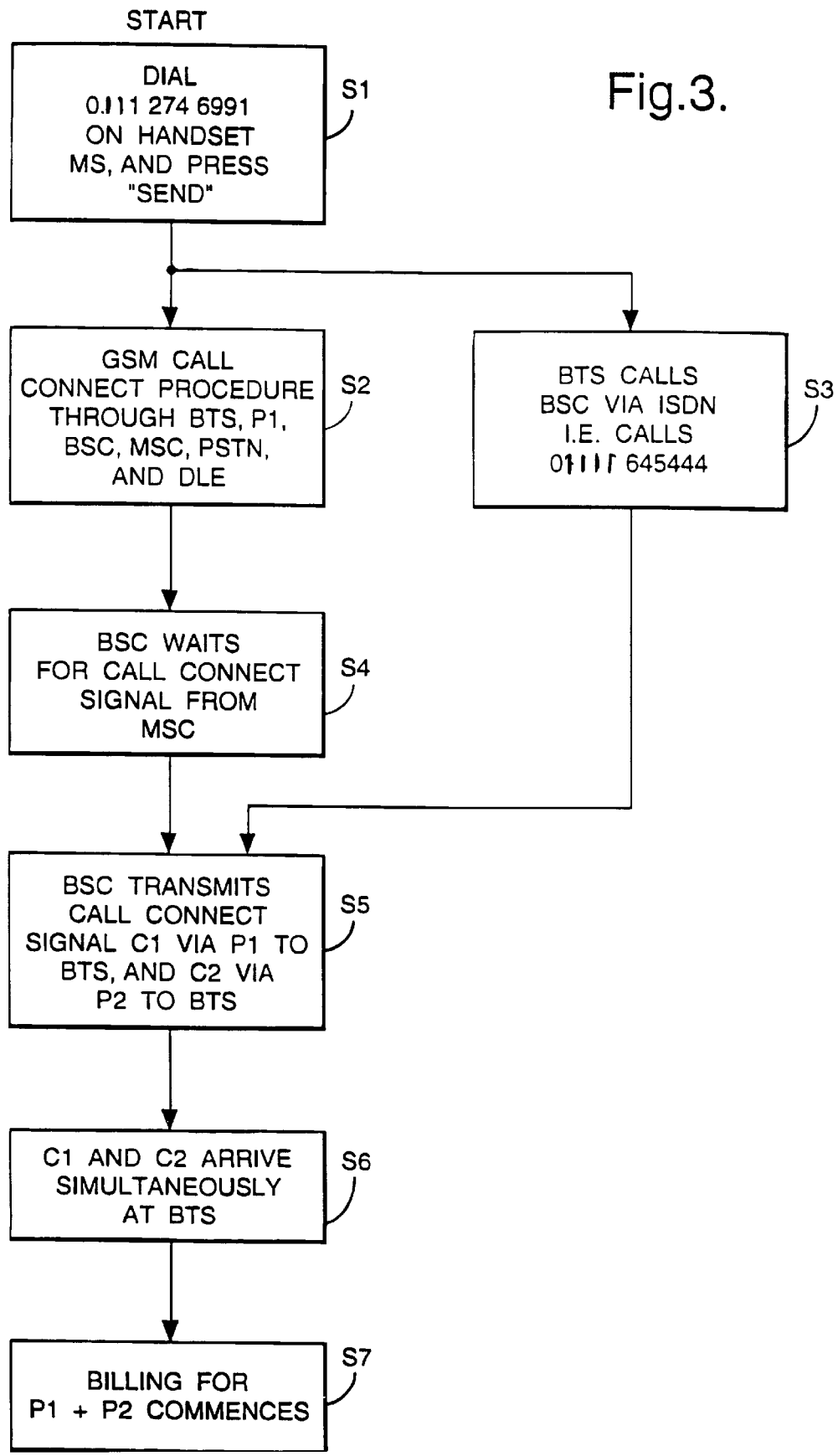
FIG. 3 illustrates a call connection protocol.

FIG. 3 is a flow chart showing seven steps S1 to S7 which take place during call set-up. It should be noted that step S3 takes place in parallel with steps S2 and S4.

Figure 5:
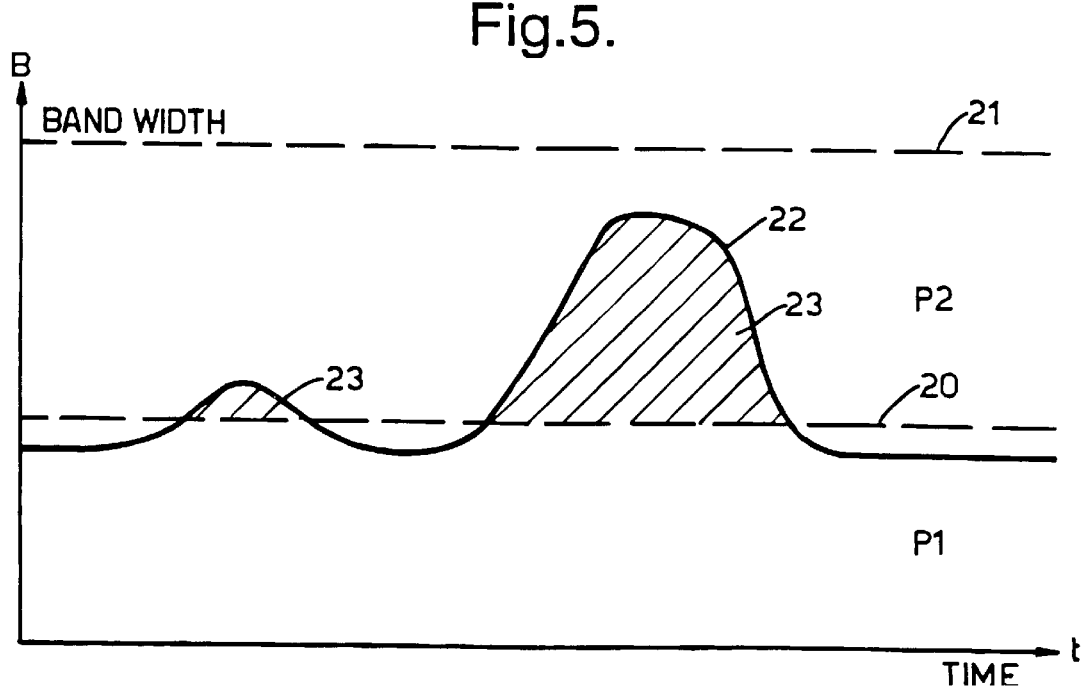
FIG. 5 is a graph illustrating bandwidth variations that occur with time for data communication between the BTS and BSC shown in FIG. 2.

FIG. 5 is a graph of the bandwidth requirement for signal communication between the BTS and BSC as a function of time. The maximum bandwidth that can be handled by path P1 is shown by dotted line 20 and the additional bandwidth that can be provided by path P2 is shown by dotted line 21. Thus, when the graph 22 lies below line 20, path P1 can be used alone but path P2 is required for the shaded areas 23 shown in the graph.

Referring now to FIG. 1 in more detail, the leased lines 1, 2, 3 are usually leased from a terrestrial system provider. A conventional full so-called E1 digital leased line offers a bandwidth of 2 MB/s. However, the bandwidth for data from typical BTS is of the order of 1 MB/s and so an E1 leased line would have an inefficient bandwidth utilisation for the connection between each BTS and the associated hub H1. An alternative offered by terrestrial system providers is to lease bandwidth on a N×64 kb/s basis for which the GSM system provider leases from the terrestrial system provider a bandwidth allocation of N×64 kb/s on a continuous basis, N being a fixed integer selected depending upon the utilisation rate of the BTS. Thus, if the BTS is expected to handle a large number of calls, N will be selected at a relatively high value, whereas if the BTS is located in a position where a lower rate can be expected, N will be selected to have a lower value. Once selected by the system provider, N cannot readily be changed. Renting a line in this way is cheaper than an El leased line but the value of N needs to be carefully selected. It is to be understood that the utilisation rate of the GSM system varies greatly depending on a number of factors such as the time of day, but not all factors can be predicted; for example, users may randomly distribute themselves in the vicinity of one particular BTS at one particular time, thereby raising the utilisation rate. The value of N for the line is thus selected as a compromise between the maximum possible bandwidth required for full capacity of the BTS and the average utilisation rate that usually occurs for the BTS. However, this can lead to inefficient use of the bandwidth of the lines 1, 2, 3 with the disadvantage that the GSM system user has to rent more bandwidth than is normally used, in order to deal with peak demand and thereby provide a satisfactory service to mobile system users.

As shown in FIG. 1, a second signal communication path is provided between BTS1 and the associated hub H1 through an integrated services digital network ISDN 10 (shown in FIG. 1 in two portions 10a, 10b). This second communication path includes a first link 11 from the hub H1 to the network 10a and a second link 12 from the network 10a to BTS1. Corresponding links are provided to all of the BTS's connected to the hub. Thus, for BTS2, link 13 together with link 11 provide a corresponding second communication path to augment the first path 2. Thus, in accordance with the invention, the bandwidth for the first communication path P1 provided by leased line 1, can be selected to have a lower value of N than hitherto so that its bandwidth is used more efficiently during normal use. In the event that the number of calls increases so that a higher bandwidth is required between BTS1 and H1, the system is operative to selectively establish a second communication path P2 through the ISDN 10a via links 11, 12 thereby augmenting the available bandwidth. Whilst the leased line is billed on a continuous time basis, use of the ISDN is billed on the time for which it is connected, so that it is only necessary to pay for the ISDN for the period that the second communication path through links 11 and 12 is actually connected. Thus, charges are only incurred whilst a connection is made in respect of the second communication path, so that the second path is only paid for when needed.

Considering now the connection to the BSC, the bandwidth of the various signals received at hub H1 are multiplexed and communicated on a third path through leased line 3 to the BSC and its associated cross connect CC1. The combined bandwidth of the signals distributed by the hub H1 is somewhat greater than the bandwidth of signals communicated between each individual BTS and the hub so that the use of an E1 leased line for the line 3 is appropriate. However, during periods of heavy use of the system, the bandwidth of the signals may exceed the available bandwidth of the line 3. In order to overcome this problem a fourth communication path may be established through the ISDN 10 through portion 10b, by means of links 14, 15 in a similar way to that described with reference to the BTS's. In this way, a higher level of bandwidth utilisation can be achieved for the line 3, with peak demand being channelled through the ISDN, through links 14, 15 (during periods of need, rather than on a continuous basis. Other architectures are possible. For example, the base transceiver sites BTS may be connected directly to the mobile switching centre MSC. The ISDN or similar network may be used to augment the bandwidth over any of the links in these architectures.

The signal communication protocols will now be described in more detail with reference to FIG. 2, which shows a simplified version of the network with only one BTS connected directly to the BSC, it being understood that the actual network in practice will include many links, as exemplified in FIG. 1. In FIG. 2, the BTS is connected by a leased line P1 to the BSC and the connection can be established over path P2 through the ISDN. The BTS is given its own ISDN telephone number, in this example, 01 999 643997. Similarly, the BSC is given an ISDN telephone number 01111 645444. The BTS can make a connection to the BSC through ISDN by dialling the appropriate telephone number i.e. 01111 645444. The BSC can similarly form a connection to the BTS. Communication through the ISDN is according to signal format LAPD, on the D channel in a manner known per se.

An example of a call connection procedure will now be given, in which the handset MS initiates a connection to the telephone 8, which in this example has the telephone number of 0111 274 6991. Referring to FIG. 3, at step S1, the user of the mobile handset MS operates its dial pad to dial the telephone number of telephone 8 (FIG. 2) and presses the "send" button in order to initiate the call. Signals are transmitted in GSM format to the BTS and a call connection is established in a conventional manner over the first communication link P1 that comprises an N×64 kb/s leased line connected to the BSC, and then through the MSC over line 4, the PSTN over line 7 and thence to the telephone 8 through the DLE and line 9. This is shown at step S2.

Referring to FIG. 2, network management NM may determine that the bandwidth of path P1 is insufficient to process the requested call connection and that it is appropriate to open a second communication path P2 through the ISDN. If this is the case, the BTS calls the BSC via the ISDN by transmitting calling signals for telephone number 01111 645444, as shown at step S3 in FIG. 3.

There will, in general, be a time difference between the time taken to open the path P2 through the ISDN and the call connection through path P1 and paths 4, 7 and 9. In particular, the call connection through path P1 may not be completed if the call is not answered or the called party is engaged on another call. In order to accommodate these different set-up times, the BSC waits for an indication from the MSC that the call connection to telephone 8 has been established, as shown at step S4, after which, at step S5, the BSC transmits call connect signals C1, C2 back to the BTS over the paths P1 and P2 respectively, with timings selected so that C1 and C2 arrive simultaneously at the BTS, as shown at step S6. Thus, the time billing for the call for the ISDN route P2 is the same as that for the conventional landline route P1 and no billing discrepancies thereby occur.

The described system also allows telephone 8 to call the mobile station MS, in which case the connection over path P2 is established by the BSC calling the BTS i.e. by dialling telephone number 01 999 643997.

Similarly, the invention allows suitable control of call disconnect signals for paths P1 and P2.

The call connection scheme is also configured to handle dropped calls (when the MS moves out of the radio coverage area) and handover (when a mobile station moves from one BTS to another).

For security purposes, the BTS and the BSC are configured to check the identity of calling stations via the ISDN using calling line identifying (CLI) signals. If the calling number does not correspond to a known BSC or BTS number, the system may record the calling number so that data can be sent to the network management system NM for review and, if the number occurs regularly, further action can be taken if necessary.

The configuration of the signals transmitted between the MS, BTS and BSC will now be described in more detail with reference to FIG. 4. The mobile handset MS when using GSM techniques typically transmits at a data rate 22.8 kb/s with speech coding of 13 kb/s, over a radio link to the BTS. For the leased line P1, 4:1 multiplexing may be used. The line P1 typically has a bandwidth of N×64 kb/s in which case 4×13 k is multiplexed into 1×64 k time slots. For the path P2, the so-called ISDN2 channel provides 2×64 kb/s channels available for data transceiver which can therefore handle 8 multiplexed calls. The connection between the ISDN 10 and the BSC comprises 30 channels so that up to 15 BTS's can be connected to the BSC each with 2×64 kb/s channels.

Since the path P2 can handle more than one call simultaneously, software is provided to ensure that no channels are in use before the path P2 is disconnected to avoid unwanted call disconnection. Also, a check can be made when a call is initially being set up, whether the path P2 is already open for another call, in order to avoid unnecessarily setting up a further path through the ISDN.

In an alternative configuration, the data is transmitted between the MS and BTS at half rate i.e. with speech at 7 kb/s in which case 8:1 multiplexing can be used for the paths P1, P2.

At times of low demand it is undesirable for the system to route calls by way of path P2, because this leaves unused capacity on path P1, which is already paid for as it is a leased line. The bandwidth requirement may be judged on a call-by-call basis in which case the local network management may instruct the BTS/BSC whether the path P2 is needed. However, it is undesirable for the system to select path P1 to carry a call if this would result in very little, or no, capacity remaining to set up further calls. It would be possible to transfer calls from one path to the other whilst in progress, for example if capacity is required for more call set-up signalling on path P1, but the extra time required to make a signalling channel available on path P1 by transferring a call from path P1 to path P2 would increase call set-up times unacceptably. It is therefore desirable to allocate calls to path P2 such that sufficient capacity always remains on path P1 to handle at least the signalling required for the level of call traffic expected.

The decision to select path P2, in order to augment the available bandwidth, can be made in a number of different ways. Firstly, it can be made according to the time of day or some other appropriate period determined by traffic flow trend analysis. As shown in FIG. 5, the bandwidth requirement typically varies with time and for some locations, there may be a recognisable diurnal or other pattern. in which case path P2 can be switched on for periods of high use predicted by the BTS/BSC or NM.

Also, local network management at the BTS/BSC level can detect traffic levels rising towards the limit 20, at which time the second path P2 is switched on to augment the available bandwidth.

Whilst the invention has been described in connection with a GSM network, other transceiver techniques can be used, for example in DCS 1800, PCS (DCS 1900). JDC. DAMPS. The invention is also applicable to analogue cellular systems.

What is claimed is:

1. A mobile telephone system comprising:

a base transceiver station providing radio communication with one or more mobile stations;

a control station providing call connections between a mobile station and other network terminations;

a communication link providing a first communication path for signals communicated between the base transceiver station and the control station;

the base transceiver station and the control station further having connections for communication with a communications network;

control means operable to selectively provide a second communication path, through the communications network, for augmenting the bandwidth available on the first communication path for signals communicated between the base transceiver station and the control station; and means for initiating time billing for the first and corresponding second paths in a predetermined time relationship in response to initiation of a dialled call connection between a mobile station and a network termination.

2. A system as in claim 1, including:

means for transmitting respective call connect signals along the first and second communication paths in response to establishment of respective paths, means for preventing transmission of the call connect signals until both paths are established; and means responsive to reception of the call connect signals for initiating time-related billing for the first and second paths respectively.

3. A system as in claim 2 including:

means for transmitting call connect signals along the first and second communication paths from one end to the other such that they arrive at the other end substantially simultaneously.

4. A system as in claim 1, wherein the control means provides the second communication path according to the time of day.

5. A system as in claim 1, wherein the control means includes network management means for detecting usage of the first path and for selectively operatively connecting the second path in accordance with such usage.

6. A system as in claim 5 wherein the control means is arranged to provide the second path if detected usage of the first path exceeds a given level.

7. A system as in claim 1 wherein the control means includes means responsive to a dialled call attempt for determining whether the first path offers sufficient bandwidth for the call, and if not, routing the call through the second path.

8. A system as in claim 1 wherein, for each call connected, traffic is carried on either the first path or the second path, according to the operation of the control means but in either case control signalling between the mobile station and the network termination is carried on the first path.

9. A system as in claim 1 wherein the control station comprises a controller for controlling said base transceiver station, the first and second communication paths being provided between the controller and the base transceiver station.

10. A system as in claim 9 including a hub for controlling a plurality of the base transceiver stations, the first and second communication paths being provided between the hub and a base transceiver station.

11. A system as in claim 10 including a plurality of said base transceiver stations connected to the hub, and respective said first and second communication paths being provided between the hub and each base transceiver stations.

12. A system as in claim 10 including a third communication path between the hub and the controller, and means for selectively providing a fourth communication path through the network between the hub and controller.

13. A method of providing a communication channel for mobile telephony, wherein a base transceiver station provides radio communication with a mobile system and the base transceiver station provides communication with a control station; the method comprising:

providing a first communication path with a predetermined bandwidth for signals communicated between the base transceiver station and the control station through a fixed communication line, and selectively providing a second communication path for signals communicated between the base transceiver station and the control station, through a communication network for augmenting the available bandwidth for the signals;

wherein time billing is initiated for the first and second paths in a predetermined time relationship in response to initiation of a dialled call connection.

14. A method as in claim 13, in which:

respective call connect signals are transmitted along the first and second communication paths in response to establishment of the respective connections, and transmission of one or both of the call connect signals is prevented unless both connections are established.

15. A method as in claim 14 wherein:

call connect signals are transmitted along the first and second communication paths from one end to the other such that they arrive at the other end substantially simultaneously, and time billing is initiated for the first and second paths respectively in response to reception of the call connect signals.

16. A method as in claim 13, wherein the second path is selectively operatively connected in accordance with the degree of usage of the first path.

17. A method as in claim 15 wherein the second path is provided if detected usage of the first path exceeds a given level.

18. A method as in claim 13, wherein the second communication path is provided according to the time of day.

19. A method as in claim 13, wherein the call is routed through the second path in response to a call attempt if the first path does not offer sufficient bandwidth for the call.

20. A method as in claim 13 wherein for each call, traffic is carried on either the first path or the second path, but in either case control signalling between the mobile station and the network termination is carried on the first path.

21. A method as in claim 13, the first and second communication paths being provided between a controller and a base transceiver station controlled by said controller.

22. A method as in claim 21 wherein first and second communication paths are provided between a hub and one or more base transceiver stations controlled by the hub.

23. A method as in claim 22 wherein a fourth communication path is selectively provided through the network between the hub and controller to augment a third communication path existing between the hub and the controller.

* * * * *